(No Model.)
T. E. ADAMS.
CARBON HOLDER FOR ELECTRIC ARC LAMPS.
No. 545,755.    Patented Sept. 3, 1895.
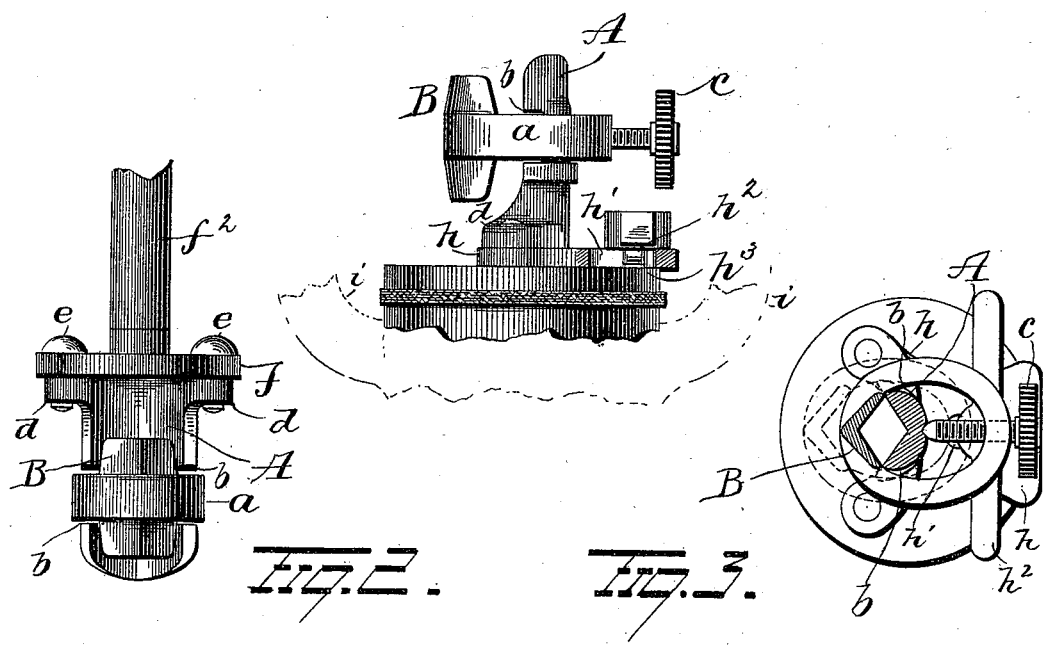
Witnesses
C. J. Nottingham
G. F. Downing
Inventor
T. E. Adams
By H. A. Seymour
Attorney

UNITED STATES PATENT OFFICE.

THOMAS EDGAR ADAMS, OF CLEVELAND, OHIO.

CARBON-HOLDER FOR ELECTRIC-ARC LAMPS.

SPECIFICATION forming part of Letters Patent No. 545,755, dated September 3, 1895.

Application filed February 15, 1895. Serial No. 538,545. (No model.)

*To all whom it may concern:*

Be it known that I, THOMAS EDGAR ADAMS, a resident of Cleveland, in the county of Cuyahoga and State of Ohio, have invented certain new and useful Improvements in Carbon-Holders for Electric-Arc Lamps; and I do hereby declare the following to be a full, clear, and exact description of the invention, such as will enable others skilled in the art to which it appertains to make and use the same.

My invention relates to an improvement in carbon-holders or socket-pieces for electric-arc lamps, the object of the invention being to so construct a carbon-holder that it can be easily adjusted to hold various sizes of carbons in proper adjustment and admit of a damaged part being easily and cheaply replaced.

A further object is to so construct carbon-holders for electric-arc lamps that they can be readily adjusted to insure the proper alignment of the carbons.

A further object is to produce carbon-holders which shall be simple in construction, easy to manipulate, and which shall in all respects be effectual in the performance of their functions.

With these objects in view the invention consists in certain novel features of construction and combinations and arrangements of parts, as hereinafter set forth, and pointed out in the claims.

In the accompanying drawings, Figure 1 is a view illustrating my improvements. Fig. 2 is a separate view illustrating the upper-carbon holder. Fig. 3 is a similar view showing the lower-carbon holder.

The two carbon-holders are practically the same in construction, differing only slightly in detail to adapt them for the positions which they respectively occupy.

A represents the fixed jaw of the device, and B the movable jaw, the latter being provided with a yoke $a$, adapted to pass about the fixed jaw, and the latter is recessed at its sides, as at $b$, for the accommodation of said yoke, so that the jaws can be made to approach sufficiently close together to firmly grasp a small carbon. The yoke $a$ is made of such length that the jaws can be made to recede from each other to an extent sufficient to receive a large carbon between them. The yoke $a$ is made with a screw-threaded perforation for the reception of a thumb-screw $c$, the end of which is made to bear against the rear face of the fixed jaw, whereby to cause the carbon to be firmly clamped between the jaws.

The fixed jaw of the upper holder is provided with ears $d$, having screw-threaded perforations for the reception of screws $e\ e$, said screws being adapted to pass through a plate or disk $f$ and secure the holder thereto, and said plate or disk is provided with a screw-threaded shank $f'$, which is screwed into the lower end of the carbon-rod $f^2$. The perforations in the plate or disk $f$, through which the screws $e\ e$ pass, are made in the form of elongated slots $g$, so as to permit the holder to be adjusted, and thereby permit the proper alignment of carbons of different diameters.

The fixed jaw of the lower-carbon holder is secured to a plate $h$, having an elongated slot $h'$, through which a screw $h^2$ passes and enters the carbon-holder carrier $h^3$, located at the junction of the depending arms $i$ of the lamp-frame. It will thus be seen that the lower-carbon holder can also be adjusted to insure the proper alignment of the lower carbon with the upper carbon.

My improvements are exceedingly simple in construction, can be readily operated to clamp the carbons and insure their proper alignment, and are effectual in every respect in the performance of their functions.

Having fully described my invention, what I claim as new, and desire to secure by Letters Patent, is—

1. In a carbon holder for electric arc lamps, the combination with a plate, of a normally fixed jaw having a lateral projection pivotally and adjustably connected with said plate out of line with the axis of the holder, a movable jaw, a yoke carrying the movable jaw and embracing the fixed jaw and a screw passing through said yoke and engaging the fixed jaw, substantially as set forth.

2. In a carbon holder, the combination with a fixed jaw having recesses in its sides, of a movable jaw, a yoke projecting from the movable jaw and extending through the recesses in the fixed jaw to a point in rear of said fixed jaw, and a thumb screw passing through said yoke and engaging said fixed jaw, substantially as set forth.

In testimony whereof I have signed this specification in the presence of two subscribing witnesses.

THOS. EDGAR ADAMS.

Witnesses:
H. S. WALKER,
A. D. DORMAN.